Dec. 29, 1959   M. W. DUNLAP   2,918,764
METHOD OF MAKING A FILTER CARTRIDGE
Filed Dec. 27, 1954
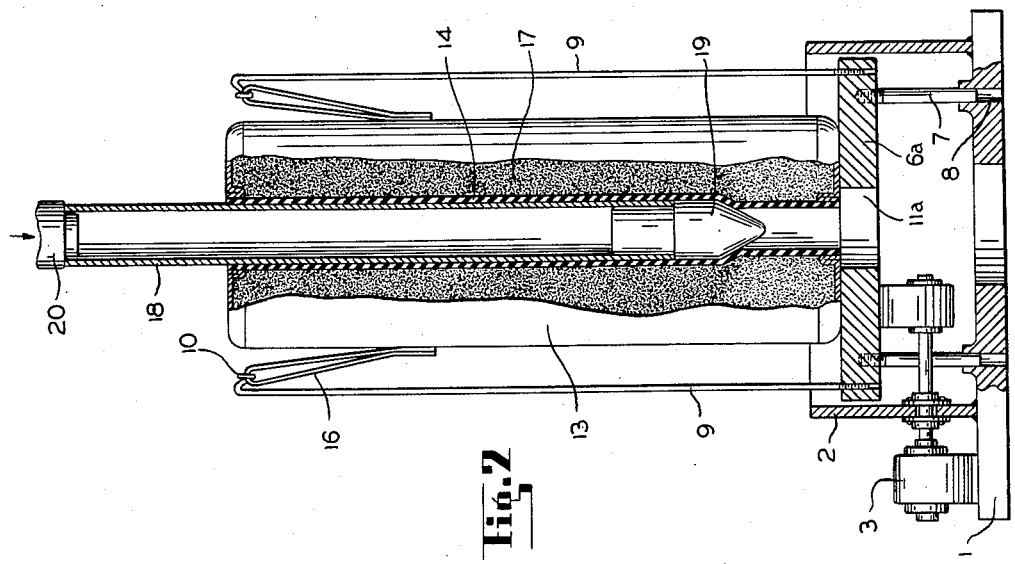
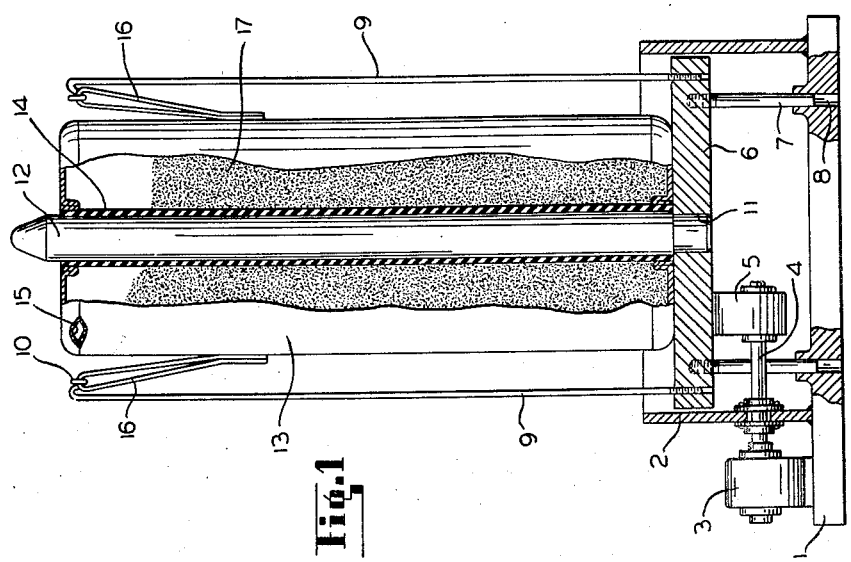
INVENTOR.
MARION W. DUNLAP
BY
ATTORNEYS

2,918,764
METHOD OF MAKING A FILTER CARTRIDGE

Marion W. Dunlap, Lebanon, Ind., assignor to Indiana Commercial Filters Corporation, a corporation of Indiana Application December 27, 1954, Serial No. 477,806

6 Claims. (Cl. 53—24)

This invention relates to improvements in a method of making a filter cartridge, the invention being highly desirable for use in connection with filter cartridges having a compressible filter medium for use in liquid filtration apparatus, the invention further being particularly desirable for use in connection with filter cartridges having a pulverulent filter medium, although the invention will have other uses and purposes as will be apparent to one skilled in the art.

Heretofore, difficulty has been experienced in packing a filter cartridge sufficiently tightly with the filter medium itself. This was especially true in those conditions where the cartridge is of generally cylindrical shape and occupies a position with its long axis substantially vertical when mounted in the casing of the filtration apparatus. An insufficiently tightly packed cartridge was especially noticeable and irksome when the cartridge contained a pulverulent filter medium, such as fuller's earth, kieselguhr, diatomaceous earth, or the equivalent. When disposed in the casing of the filtration apparatus, the puverulent filter medium tended to settle toward the bottom, perhaps due to jarring in handling or jarring when placed in the casing, thereby causing looseness at the top of the cartridge and interfering materially with effecting an adequate seal at the top of the cartridge to prevent bypassing. This aggravation was in most cases augmented by the fact that pulverulent filter medium is subject to particle orientation during use, particularly while the liquid being filtered is passed through the medium under pressure. With the particle orientation, there is an additional tendency of the filter cartridge to settle and when a flexible bag is utilized to contain the filter medium, the bag tends to become somewhat pear-shaped, adding to the difficulties of preventing bypassing over the top of the bag and down along the center tube that customarily extends through the bag.

Efforts were made heretofore to offset settling of the filter medium, with the consequent change in shape of the bag itself, and in some cases these efforts were directed toward binding the bag circumferentially at spaced intervals with a strip of heavy non-stretchable tape or the like, and in other instances by mounting the bag in a metallic or equivalently rigid perforated basket which confined the bag. Other and various expediencies were resorted to, but were objectionable in that they added materially to the cost of manufacture of the filter cartridge or to the cost of the equipment in which the cartridge was used.

Further, extreme difficulty has been experienced in the past in adequately packing a flexible bag with pulverulent filter material, since the bag must be closed except for a filling opening, and even though the pulverulent material be introduced under pressure into the bag, it is difficult to adequately fill the bag adjacent the opening, and thereafter close that opening. Frequently, such procedure resulted in filter cartridges that were not packed as tightly as desired, and also in filter cartridges that were not uniform or identical in character.

With the foregoing in mind, it is an important object of the instant invention to provide a method of making a filter cartridge which may embody a flexible bag or container, and in which the filter medium, pulverulent or otherwise, is tightly packed in a manner that it will remain tightly packed during use.

Also a feature of the invention resides in the provision of a method of making a filter cartridge in which the filter medium, pulverulent or otherwise, is maintained under lateral or radial compression both before and during use.

Another object of the invention is the provision of a method of making a filter cartridge including the filling of a flexible or fabric bag with a pulverulent filter medium in such a manner that the medium is under compression in substantially every direction and remains so during use of the cartridge.

A further object of the instant invention is the provision of a method of making a filter cartridge including filling a flexible bag with a pulverulent filter medium while agitating the bag, and then laterally compressing the medium in the bag.

Still a further feature of the invention resides in the provision of a new and novel method of making a filter cartridge, whereby the filter medium itself is placed and maintained under lateral compression.

While some of the more salient features, characteristics and advantages of the instant invention have been above pointed out, others will become apparent from the following disclosures, taken in conjunction with the accompanying drawing, in which—

Figure 1 is a part sectional part elevational view of a filter cartridge embodying principles of the instant invention undergoing formation with the aid of suitable apparatus, and Figure 2 is a view similar in character to Fig. 1, but illustrating the method of completing the cartridge.

As shown on the drawings:

In the practice of the instant invention and in the making of a filter cartridge embodying principles of the instant invention, agitating or vibratory apparatus is preferable. That apparatus may be of any suitable nature capable of holding and vibrating a cartridge or the jacket of a cartridge during the filling thereof with the filter medium. To this end, I have illustrated a satisfactory form of such vibratory apparatus, but it will, of course, be understood that the particular illustrated form of apparatus is not essential to practice of the instant invention.

The illustrated form of vibratory apparatus includes a base 1 on which is mounted a hollow or tubular supporting frame 2. Also mounted on the base is any suitable form of prime mover, such as an electric motor 3, provided with a shaft 4 suitably journaled in the frame 2, and carrying on its inner end an off center or cam-like member 5. A platform 6 floatingly mounted inside the frame 2 rests upon the cam-like member 5, and this platform has a plurality of guide rods 7 depending therefrom, which guide rods are reciprocable within suitable apertures 8 in the base 1. It will therefore be noted that when the motor is in operation, the platform 6 is vibrated or agitated upwardly and downwardly by the action of the cam-like member 5 upon which the platform rests.

Suitable filter supporting means are mounted upon the platform 6, and in the illustrated instance these means comprise upright supporting means such as two or more rods 9—9 secured at their lower ends in the platform, and provided with hook-like elements 10 at their upper ends. The platform is also provided with a center aperture as indicated at 11 to support the lower reduced end of a suitable upstanding mandrel 12 made of metal, wood, or any other satisfactory and relatively rigid material.

The filter cartridge itself comprises a bag or container 13, preferably of a fabric material such as a light canvas or the like, and which embodies a central opening or passage defined by a tube 14 of felt or equivalent material stitched to the bag and forming a part of the bag. The entire bag including the tube 14 may be fabricated of as many pieces as may be deemed most expedient, but it is understood that the bag is entirely closed around the tube, when made, except for a relatively small filling opening as indicated at 15. The bag is also provided with a pair of opposed handles 16—16 which may be in the form of suitable tape loops sewed or otherwise secured to the outer surface of the bag.

In forming the cartridge, the empty bag is mounted over the mandrel 12, as seen clearly in Fig. 1, and suspended from the hooks 10—10 by the handles 16. The lower end of the bag may or may not rest upon the platform 6, but in either event will be agitated by the movement of that platform. When so mounted, the bag is filled through the opening 15 with a suitable filter medium, and in the illustrated instance this filter medium is pulverulent earth of the character of fuller's earth, and indicated at 17.

It is to be especially noted that the diameter of the mandrel 12 is definitely or materially less than the diameter of the bag tube 14. Thus, the filling of the bag with the filter medium will tend to compress the tube 14 inwardly around the mandrel, allowing a goodly quantity of filter medium to be placed in the bag. The filter medium may be delivered to the interior of the bag through any suitable form of apparatus, preferably under pressure. After the bag has been packed with the medium, and it will be understood that the bag is being constantly agitated by virtue of the movement of the platform 6 during the filling operation, the opening 15 is stitched or otherwise tightly closed. Of course, the agitation of the bag during filling effects a preliminary settling of the filter medium, insuring tighter packing of the bag.

After the bag has been filled and closed, it is removed from the agitating apparatus of Fig. 1, and disposed on a similar agitating apparatus as seen in Fig. 2. Of course, the mandrel 12 stays with the apparatus of Fig. 1 when the bag is removed. In the apparatus of Fig. 2, the construction and operation is the same as that of Fig. 1, but a platform 6a is utilized having a larger central opening indicated at 11a. When positioned on the platform 6a, and suspended from the rods 9—9, a temporary tube 18, which remains in the cartridge until it is installed in filtration apparatus, is forced through the bag tube 14. This temporary tube 18 may be of cardboard, fiber board, or equivalently relatively rigid material. This tube 18 has an outside diameter substantially equal to the inside diameter of the bag tube 14, and therefore is larger in diameter than the aforesaid mandrel 12 around which the bag was filled. The lower end of the tube 18 is preferably equipped with a steel or metallic pilot nose 19 to facilitate the forcing of the tube 18 into the bag tube 14. This forcing may be accomplished in any suitable manner, such as by a ram diagrammatically indicated at 20 in Fig. 2, and moved by any suitable pressure means such as pneumatic or hydraulic pressure apparatus. The tube 18 is forced downwardly into the bag tube 14, and when the tube 18 reaches the bottom of the bag, the pilot nose 19 will have passed through the opening 11a and the platform 6a and may readily be removed for use upon the following tube.

It will be especially noted that the force fitting of the temporary tube 18 within the bag tube 14 causes a definite expansion of the bag tube 14 to its normal size and thereby produces an effective lateral or radial compression of the filter medium inside the bag. With the temporary tube 18 remaining in the bag, the filter medium itself is under compression in substantially every direction, and the bag is tightly packed throughout, and particularly so at its upper end. It will also be noted that on the illustrated bag, there are no additional circumscribing binding means whatever, because they are not essential, and once so constructed with radial or lateral compression of the filter medium, it is not necessary to include a perforated supporting basket for the bag in the filtration apparatus with which the cartridge is utilized.

It may be well to point out herein that when the cartridge is mounted in filtration apparatus, it is pressed over a center tube forming a part of that apparatus, which center tube is substantially the same size as the temporary tube 18, and in pressing the bag or cartridge over the center tube, the temporary tube 18 is forced out of the cartridge to be disposed of in any desired manner. Accordingly, even when mounted in the filtration apparatus, the filter medium remains under its lateral or radial compression, and the bag or cartridge does not tend to sag in use, and particularly does not tend to bulge at the bottom, and becomes slack at the top so that bypassing might occur between the sealing means of the filtration apparatus and the top of the filter cartridge.

From the foregoing, it is apparent that my method results in a filter cartridge containing more filter medium, and packed more tightly than was heretofore possible in the production of filter cartridges of the same general type. The cartridge is economical and requires no external aid in maintaining its shape before or during use. The construction of the cartridge is such that it may be relatively roughly handled before installation in filtration apparatus, without any injury to the cartridge. It will also be noted that the cartridge may be expeditiously made in a very economical manner by my new method of construction, which insures lateral or radial compression of the filter medium at all times.

It should be further noted that the agitation of the filled and closed bag when the temporary tube 18 is forced therein is not essential though it may be preferable. A result satisfactory for most uses may be obtained by merely resting the bag on a platform 6a that is stationary and not agitated and forcing in the temporary tube 18.

The filter cartridge set forth herein is more fully disclosed, described, and claimed in my copending application entitled "Filter Cartridge," filed January 9, 1958, Serial No. 707,879, which application is a division of the instant one.

It will be understood that modifications and variations may be effected without departing from the scope of the novel concepts of the present invention.

I claim as my invention:

1. The method of making a filter cartridge which embodies a flexible bag having a central passage and closed except for a filling opening, including the steps of filling the bag through the filling opening with pulverulent filter medium, agitating the bag while the same is being filled, closing said opening after the bag is filled, and forcing through said passage a relatively rigid member of a diameter larger than the diameter of said passage when said bag is filled with the filter medium, to exert radial compression on the filter medium.

2. The method of making a filter cartridge which embodies a flexible bag having a central passage and closed except for a filling opening, including the steps of filling the bag through the filling opening with pulverulent filter medium, agitating the bag while the same is being filled, closing said opening after the bag is filled, forcing through said passage a relatively rigid member of substantially greater diameter than the diameter of the passage when the cartridge is filled, to exert radial compression on the filter medium, and agitating the filled bag while said member is being forced through said passage.

3. The method of making a filter cartridge which embodies a flexible bag having a central passage and closed except for a filling opening, including the steps of filling the bag through the filling opening with pulverulent filter medium, closing the opening, and compressing the medium laterally in the bag by forcefully inserting a member in said passage which member is of greater diameter than said passage after the bag is filled.

4. The method of making a filter cartridge, including the step of filling a container having a flexible walled passage therethrough with a filter medium, and then forcing a temporary member by larger diameter than said passage after filling the container through said passage to laterally compress said medium.

5. The method of making a filter cartridge embodying a flexible bag of generally cylindrical shape and having a central passage therethrough defined by a part of the bag, including the step of mounting the bag over a mandrel extending through said passage but of materially less diameter than said passage, filling the bag with a filter medium, withdrawing the filled bag from the mandrel, and forcing a member of a diameter materially more than the diameter of said passage after the bag is filled into said passage to exert radial compression on the filter medium.

6. The method of making a filter cartridge, including the steps of filling a container having a flexible walled passage therethrough sufficiently tightly to reduce the size of said passage, closing said container, and thereafter forcing into said passage an element of sufficient size to expand said passage and maintain lateral compression of the filter medium.

References Cited in the file of this patent

UNITED STATES PATENTS

| | | |
|---|---|---|
| 2,046,367 | Collins | July 7, 1936 |
| 2,423,358 | Wheaton | July 1, 1947 |
| 2,521,833 | Dahl | Sept. 12, 1950 |
| 2,540,272 | Malmstrom | Feb. 6, 1951 |
| 2,546,650 | Nijboer | Mar. 27, 1951 |
| 2,549,698 | Mason | Apr. 17, 1951 |
| 2,584,771 | Wilkinson | Feb. 5, 1952 |
| 2,647,633 | Greene | Aug. 4, 1953 |
| 2,675,919 | White | Apr. 20, 1954 |